Figure 1:
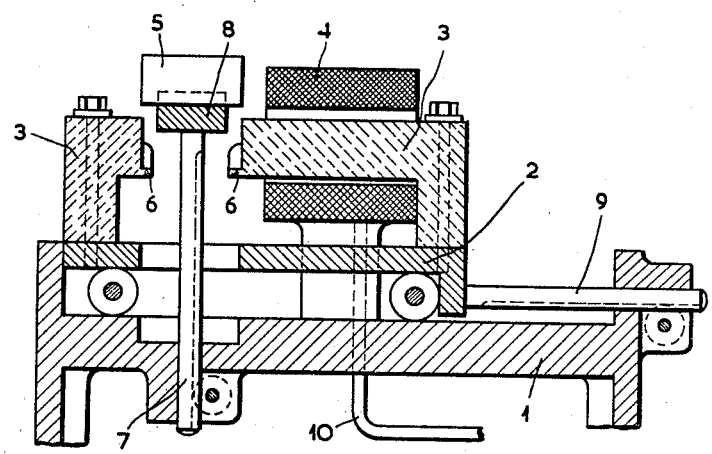

Nov. 8, 1960   A. SCHMIDT   2,959,660
DEVICE FOR HEATING INDIVIDUAL WORKPIECES INDUCTIVELY
Filed April 22, 1958   2 Sheets-Sheet 1

INVENTOR
ARTUR SCHMIDT
BY
AGENT

Nov. 8, 1960    A. SCHMIDT    2,959,660
DEVICE FOR HEATING INDIVIDUAL WORKPIECES INDUCTIVELY
Filed April 22, 1958    2 Sheets-Sheet 2

INVENTOR
ARTUR SCHMIDT
BY
AGENT

United States Patent Office 2,959,660
Patented Nov. 8, 1960

2,959,660

DEVICE FOR HEATING INDIVIDUAL WORK-PIECES INDUCTIVELY

Artur Schmidt, Reichenbach (Fils), Germany, assignor to North American Philips Company, Inc., New York, N.Y., a corporation of Delaware Filed Apr. 22, 1958, Ser. No. 730,165

Claims priority, application Germany May 22, 1957

6 Claims. (Cl. 219—10.69)

The present invention relates to devices for heating workpieces inductively, which workpieces are each individually placed on a carrier extending axially through the induction coil. Either the workpieces together with the carrier or the coil are moved relative to each other in order to bring them into the magnetic field of the coil. Hitherto, either the coil or the carrier with the workpiece was movable in a longitudinal direction. In the case of the coil being stationary, the carrier is usually mounted on a slide or the like and passes axially through the induction coil. In one end position of the slide, the workpiece concerned is placed on the carrier. Subsequently, the slide is moved to its other end position so that the workpiece enters the space within the induction coil, where it is heated by medium- or high-frequency currents in known manner. After attaining the desired temperature, the slide is moved to its initial position and the hot workpiece is removed, cooled and further processed.

In a further known construction, the carrier is stationary and the induction coil is secured to a slide or the like so that it can be moved over a workpiece on the carrier.

As a carrier ceramic supporting means have been used which, however, are rather clumsy and yet liable to breakage since, as is well known, such ceramic materials are very brittle and consequently not resistant to often rough treatment. In a further known form, bars or tubes are used as a carrier, the cross-section of which may be considerably smaller and which are not so breakable as ceramic carriers. However, they also have to pass through the space of the induction coil and are consequently also heated by the current through the coil. This means not only loss of comparatively expensive electrical energy, but also detracts from the mechanical rigidity of the supporting material.

According to the invention, these difficulties are avoided. A device according to the invention has the feature that the carrier, where the workpiece is provided, has an interruption, the length of which is such as to permit the workpiece to be supported satisfactorily. When using, in a device according to the invention, metal supporting members, which otherwise are preferably hollow as is known per se and through which a suitable coolant flows, injurious heating of these supporting members can be avoided in the rest position of the induction coil, since no current is supplied to the coil in this position. If, however, the induction coil is in its operative position, in which it surrounds the workpiece to be heated, the current through the induction coil does not appreciably heat the carrier, since only a very small part of the carrier is within the induction coil and can easily be maintained at the desired low temperature by means of the coolant. Accordingly, the electrical energy lost in heating the workpiece is likewise low in a device according to the invention.

The resistance moment of the cross-section of the carrier is preferably as high as possible. By interrupting the carrier where the workpiece is provided the carrier is divided into two halves which are to be considered mechanically as cantilevers, so that a maximum resistance moment implies low mechanical stress and negligible sagging of the cantilevers by the weight of the workpiece.

When using a liquid-cooled carrier made up of tubes in order to obtain a high resistance moment, at least two tubes may be used, which are interconnected by means of vertical bridging pieces and form a location for the workpiece at their end near the workpiece. It will be appreciated that two such parallel tubes extending perpendicularly one above the other yield a particularly sturdy structure as a result of the vertical bridging pieces and resist sagging by the weight of the workpiece.

In view of rough treatment in practice the individual workpieces are preferably not directly placed on the carrier. Therefore, the device according to the invention preferably comprises a member receiving the workpiece and being vertically movable through the interruption of the carrier. In the upper position of this receiving member it extends above the location of the workpiece on the carrier and in its lower position it does not hamper the relative movement of the workpiece and the induction coil. The individual workpiece is placed on the sturdy receiving member which is driven mechanically so that the workpiece is carefully placed on the carrier.

The member receiving the workpiece, the induction coil and the slide are preferably actuated in a constrained manner so that the placement of the workpiece and its introduction into the induction coil occur successively in correct time sequence.

Figure 2:
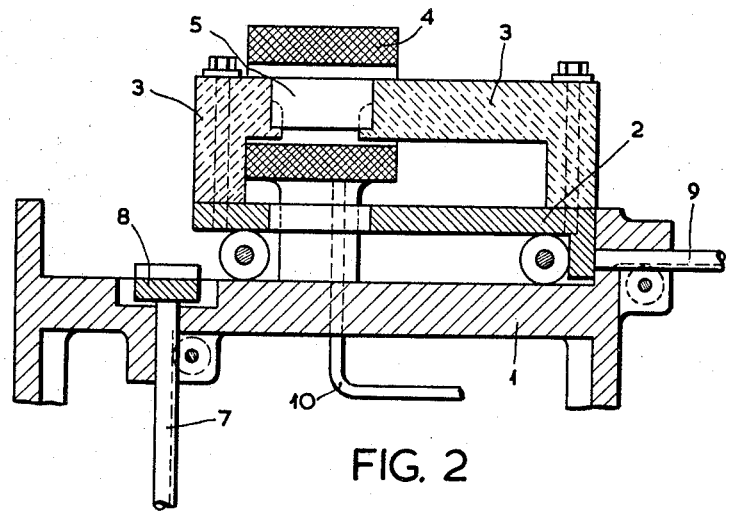
Figure 3:
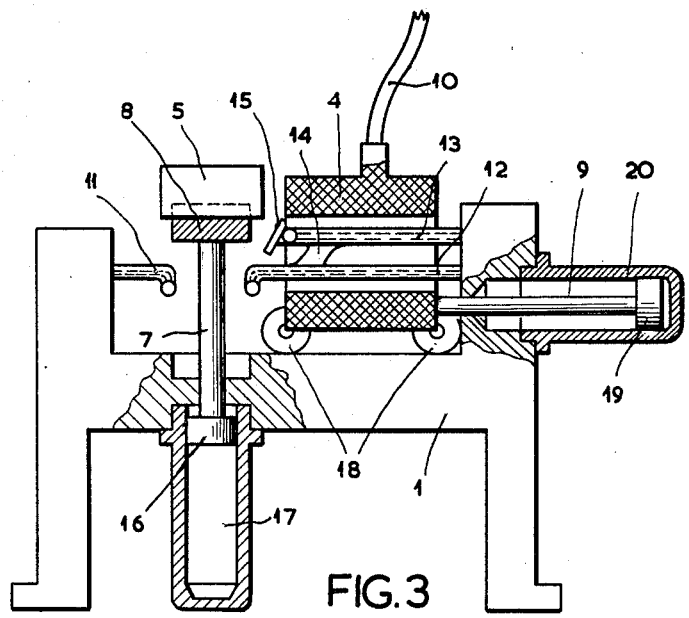
Figure 4:
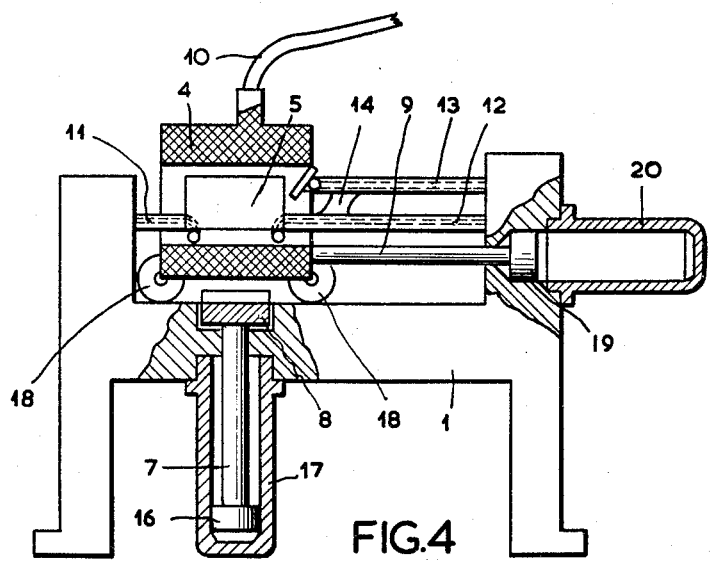

In order that the invention may be readily carried into effect, two examples will now be described in detatil with reference to the accompanying drawings in which Fig. 1 shows an inductive heating device comprising a ceramic carrier and a stationary induction coil in the rest position, Fig. 2 shows the same device in the annealing position, Fig. 3 shows an annealing device with a carrier made up of liquid-cooled tubes and a movable induction coil in the rest position, and Fig. 4 shows the same device in its operative position.

The heating device shown in Fig. 1 comprises a carriage 2 which is movable in longitudinal direction over a stand 1 and has secured to it a ceramic supporting member 3. This member passes through an induction coil 4 and has an interruption in its upper horizontal part, which interruption accommodates a workpiece 5 to be heated. At the interruption, the two halves of the carrier 3 are provided with lugs 6 supporting the workpiece 5.

In the stand 1, a pushbar 7 is vertically movable and provided at its upper end with a member 8 receiving the workpiece 5. The pushbar and the receiver are vertically movable through the interruption of the carrier 5. Provision is further made of a driving bar by means of which the carriage 2 is horizontally moved back and forth from one end position to the other. Electrical energy is supplied through a cable 10 to the induction coil 4 which is rigidly secured to the stand 1.

In Fig. 1, the annealing device is in its rest position. The carriage 2 is in its left position in which the interruption of the carrier 3 stands clear from the coil. The workpiece receiver 8 is now up and a workpiece 5 is placed on it. For annealing it the driving bar 7 is first lowered so that the workpiece 5 comes to rest on lugs 6 of the carrier 3. The receiver 8 further descends until it substantially disappears in a recess of the stand 1, as is seen from Fig. 2. In this position it does not hamper horizontal displacement of the carriage 2. Hence, the latter can be moved by means of a driving bar 9 to its rightmost position so that the workpiece 5 enters the coil 4. This position is shown in Fig. 2. Medium frequency or high-frequency energy supplied through the cable 10 to the induction coil heats the workpiece 5 in known manner, but the carrier is not appreciably heated by any parasitic high-frequency fields, since this member is chiefly outside the coil. When reaching the desired temperature the current is cut off, the carriage 2 is again moved to its leftmost position and the heated workpiece 5 is lifted by the receiver 8 so that it can be removed. In this position, shown in Fig. 1, a next workpiece can be placed on the receiver 8.

A further form of a device according to the invention is shown in Figs. 3 and 4, in which the stand 1 has secured to it a carrier made up of water-cooled metal tubes. These tubes extend from two upright columns of the stand to the right and to the left respectively with some clearance between them depending upon the size of the workpiece 5. On the left of the stand 1, provision is made of a hair pin shaped tube 11, the free end of which is bent downwardly. Opposite this tube provision is made of a similarly shaped longer tube 12 which, however, is not sufficiently rigid for supporting the workpiece 5. Therefore, another hair pin tube 13 disposed above the tube 12 has its limbs mechanically connected to those of the tube 12 through vertical parts 14. In this manner, the tube structure extending through the space of the induction coil 4 is sufficiently rigid. At the upper tube 13 provision is made of a guide face 15 guiding the workpiece 5 during its descent.

Similarly as in the device shown in Figs. 1 and 2, provision is made of a receiver 8 for conveying the workpiece. This receiver is supported by means of an associated driving bar 7 and connected to a piston 16 to permit the receiver 8 to be actuated by oil pressure. The piston reciprocates in a cylinder 17.

In this case, the induction coil 4 is movable in a longitudinal direction on rollers 18, which a driving rod 9 with an associated piston 19 and oil-pressure cylinder 20 provide for the required displacement of the coil.

In the starting position of the device shown in Fig. 3, the induction coil 4 occupies the rightmost position, in which tubes 12 and 13, through which a coolant flows, extend through the space of the coil. In this position, preferably no electrical energy is supplied through the cable 10 to the coil 4. The receiver 8 is in its upper position and carries the workpiece 5 to be heated. For annealing the workpiece the receiver 8 is lowered by corresponding control of oil-pressure conduits (not further shown), the receiver 8 placinb the workpiece 5 on the downwardly directed bend of the supporting tubes 11 and 12 until it substantially disappears in a recess of the stand 1 (Fig. 4). Subsequently, the oil-pressure in the piston 19 is raised and the induction coil 4 moves from its rightmost position to its leftmost position to occupy the position shown in Fig. 4 in which it surrounds the workpiece 5 completely. On supplying medium-frequency or high-frequency energy to the induction coil 4 through the cable 10 the workpiece 5 is heated. The supporting tubes are only slightly heated, since they extend only over a short distance into the coil and the heat evolved in their ends is easily carried off by the coolant.

After the workpiece 5 has reached the desired temperature, the same occurs, by the action of the oil pressure in cylinders 20, 17, as in the device shown in Figs. 1 and 2, so that the coil 4 is moved to the right, the current is cut off and the workpiece is lifted by the receiver 8 from which it is removed for further processing.

What is claimed is:

1. A device for inductively heating a workpiece comprising an induction coil, a carrier for said workpiece, said induction coil and carrier being movable laterally relative to each other to thereby enter and be removed from the magnetic field of said induction coil, said carrier being provided with an opening extending in a vertical direction having opposed projections protruding into said opening whereby said workpiece is supported in a certain position of the latter by at least a portion of said projection.

2. A device for inductively heating a workpiece comprising an induction coil, a liquid cooled carrier including at least two tubes, and substantially vertical bridging pieces interconnecting said tubes, said tubes supporting said workpiece, said induction coil and carrier being movable laterally relative to each other to thereby enter and be removed from the magnetic field of said induction coil, and means for inserting said workpiece on said tubes.

3. A device for inductively heating a workpiece comprising an induction coil, a carrier for said workpiece, said induction coil and carrier being movable laterally relative to each other to thereby enter and be removed from the magnetic field of said induction coil, said carrier being provided with an opening whereby said workpiece is supported in a certain position of the latter by at least a portion of the boundaries of said opening, a workpiece receiver movable in a substantially vertical direction through the opening in said carrier, and in the uppermost position of said workpiece receiver the latter extends above the supported position of said workpiece on said carrier, while in its lowermost position said workpiece receiver is in a position out of the path of relative movement of said workpiece and induction coil.

4. A device for inductively heating a workpiece as claimed in claim 3 further comprising means for the constrained control of the workpiece receiver and the induction coil.

5. A device for inductively heating a workpiece comprising an induction coil, a liquid cooled carrier including at least two tubes, and substantially vertical bridging pieces interconnecting said tubes, said tubes supporting said workpiece, said induction coil and carrier being movable laterally relative to each other to thereby enter and be removed from the magnetic field of said induction coil, and means for inserting said workpiece on said tubes, a pair of cylinders, each provided with a piston therein, one of said pistons being connected to said means for inserting said workpiece on said tubes and the other of said pistons being connected to said movable carrier.

6. A device for inductively heating a workpiece as claimed in claim 1 wherein the resistance moment of the cross-section of said carrier is as high as possible relative to said horizontal axis of said carrier.

References Cited in the file of this patent

UNITED STATES PATENTS

| 1,821,530 | Spire | Sept. 1, 1931 |
| 2,506,425 | Journeaux | May 2, 1950 |
| 2,604,577 | Strickland et al. | July 22, 1952 |

FOREIGN PATENTS

| 363,323 | Great Britain | June 10, 1930 |